(12) United States Patent
Suh et al.

(10) Patent No.: US 6,373,184 B1
(45) Date of Patent: Apr. 16, 2002

(54) RED PHOSPHOR FOR FLUORESCENT DISPLAY AND PREPARATION METHOD THEREOF

(75) Inventors: Kyung Soo Suh; Jin Ho Lee; Kyoung Ik Cho, all of Taejon; Jae Dong Byun, Seoul, all of (KR)

(73) Assignee: Electronics and Telecommunications Research Institute, Taejon (KR)

( * ) Notice: Subject to any disclaimer, the term of this patent is extended or adjusted under 35 U.S.C. 154(b) by 0 days.

(21) Appl. No.: 09/435,038

(22) Filed: Nov. 5, 1999

(30) Foreign Application Priority Data

Jul. 30, 1999 (KR) .............................. 99-31256

(51) Int. Cl.$^7$ .......................... C09K 11/50; H01J 61/44; H01J 29/20
(52) U.S. Cl. .................. 313/486; 313/468; 313/496; 427/64; 252/301.6 F; 252/301.4 F
(58) Field of Search ................. 313/496, 468, 313/486, 467; 427/64; 252/301.4 P, 301.6 R, 301.6 F, 301.4 F

(56) References Cited

U.S. PATENT DOCUMENTS

| | | | | |
|---|---|---|---|---|
| 3,693,006 A | * | 9/1972 | Chenot | 313/486 |
| 4,680,231 A | | 7/1987 | Yamaura et al. | 428/407 |
| 4,963,787 A | * | 10/1990 | Verlijsdonk et al. | 313/486 |
| 5,525,259 A | | 6/1996 | Munn et al. | 252/301 |
| 5,619,098 A | | 4/1997 | Toki et al. | 313/496 |

OTHER PUBLICATIONS

"Luminescence Properties of Pr$^{3+}$ in Cubic Rare Earth Oxides", by G. C Aumüller., J. Phy. Chem. Science, vol. 55, No. 8, pp. 767–772, Mar. 1994.

"Luminescence of Manometric Scale Y$_2$SiO$_5$: Eu$^{3+}$", by M. Yin et al., Journal of Luminescence, 1996, pp. 335–339.

"Improved Luminescence Properties of Pulsed Laser Deposited Eu:Y$_2$O$_3$ Thin Films on Diamond Coated Silicon Substrates", by K.G. Cho, et al., Appl. Phys. Lett. 71(23), Dec. 8, 1997, pp. 3335–3337.

* cited by examiner

Primary Examiner—Ashok Patel
(74) Attorney, Agent, or Firm—Antonelli, Terry, Stout & Kraus, LLP

(57) ABSTRACT

Provided with a phosphor for a fluorescent display that includes at least one divalent transition metal and at least two trivalent metal added to SrTiO$_3$ and having a formula of:

$$SrTi_{1-x-y}M_xN_yO_3:zPr^{3+}$$

wherein M represents the divalent transition metal selected from the group consisting of Zn, Mn, Co, Ni, Cu and Cd, N represents the trivalent metal selected from the group consisting of Ga, Al, In and B, and $0 \leq x \leq 0.1$, $0 \leq y \leq 0.1$ and $0 \leq z \leq 0.1$.

10 Claims, 10 Drawing Sheets

RED PHOSPHOR FOR FLUORESCENT DISPLAY AND PREPARATION METHOD THEREOF

BACKGROUND OF THE INVENTION

1. Field of the Invention

The present invention relates generally to a red phosphor for a fluorescent display and a preparation method thereof, and in particular, to an $SrTiO_3$-based red phosphor for a fluorescent display having high luminescence efficiency and high color purity and a preparation method thereof.

2. Description of the Related Art

A fluorescent display, especially, a field emission display (FED) is a flat panel display operating on the same principle of a Cathode-Ray Tube(CRT). The fluorescent display includes a cathode plate that is a field emitter array (FEA) panel for emitting electrons caused by an electric field, instead of thermal electrons; and an anode plate that is a fluorescent panel for emitting lights with the electrons emitted from the cathode plate. The cathode plate and the anode plate are separated from each other at a predetermined distance and packaged together under high vacuum. For the existing CRT tube, sulfide-based phosphors having high color purity and high luminescence efficiency are generally used. However, the FED generally operates at a low voltage of less than 5 kV, since the distance between the cathode plate and the anode plate is so short that there occurs discharging at a high voltage of above 10 kV as in the CRT tube. Therefore, many studies have been made on development of FEDs workable at a low voltage of less than 1 kV.

In the case where electrons have a low energy of 1 kV or less, electrons can be injected as deep as at most 20 nm from the surface of the phosphor so that the phosphor for the low-voltage FED has luminescence much lower than the CRT tube operating at a high voltage. Therefore, the surface condition of the phosphor greatly affects the luminescence efficiency of the phosphor. Specifically, the existing sulfide-based red phosphor widely used in the CRT tube, $Y_2O_2S$:Eu provides low luminescence efficiency and low color purity at a low voltage for the FED fluorescent display. Also, irradiation an electron beam on the surface of the sulfide-based phosphor for a long time causes a small quantity of sulfur to be released from the -sulfide-based phosphor. This leads to degrade vacuum in a small gap of about 1 mm between the cathode plate and the anode plate as in the FED panel or damage the FEA, thus deteriorating performance of the display.

To solve this problem, there has been an attempt to prepare a red phosphor for a low-voltage FED using $Y_2O_3$:Eu that is an oxide-based phosphor not ready to release sulfur, or surface-treated $Y_2O_2S$:Eu. The related methods are well disclosed in the following documents.

There is disclosed in U.S. Pat. No. 5,525,259 a method of preparing a $Y_2O_3$:Eu lamp phosphor with high resistance to water by firing a mixture of yttria, europium oxide and a flux, pulverizing the fired mixture to have an average particle size of greater than 5 measured as a Couter counter value, and coating the surface of the $Y_2O_3$:Eu particles thus obtained with gamma alumina by a chemical vapor deposition method.

K. G. Cho et al, "Improved Luminescent properties of pulsed laser deposited Eu:$Y_2O_3$: thin film", Appl. Phys. Lett., 71(23), 3335–3337, 1997 discloses a method of preparing a red thin film phosphor by depositing an europium-activated yttria (Eu:$Y_2O_3$) fluorescent thin film on a diamond-deposited silicon wafer using a pulse laser deposition method.

However, the phosphor preparation method involving $Y_2O_3$:Eu surface treatment has such a complicated procedure increasing a cost and the $Y_2O_3$:Eu phosphor has a limitation in use as a red phosphor for a low-voltage FED due to its low luminescence efficiency and low color purity at a low voltage.

SUMMARY OF THE INVENTION

It is, therefore, an object of the present invention to provide a red phosphor for a fluorescent display with high luminescence efficiency and high color purity at a low voltage without releasing any gases after a long-term projection of electrons.

It is another object of the present invention to provide a method of preparing the red phosphor for a fluorescent display in a simple and economical way.

To achieve the above objects, there is provided a phosphor for a fluorescent display that includes at least one divalent transition metal and at least two trivalent metal added to $SrTiO_3$ and having a formula of:

$$SrTi_{1-x-y}M_xN_yO_3:zPr^{3+}$$

wherein M represents the divalent transition metal selected from the group consisting of Zn, Mn, Co, Ni, Cu and Cd, N represents the trivalent metal selected from the group consisting of Ga, Al, In and B, and $0 \leq x \leq 0.1$, $0 \leq y \leq 0.1$ and $0 \leq z \leq 0.1$.

There is also provided a preparation method of a phosphor for a fluorescent display having a formula of:

$$SrTi_{1-x-y}M_xN_yO_3:zPr^{3+}$$

wherein M represents a divalent transition metal selected from the group consisting of Zn, Mn, Co, Ni, Cu and Cd, N represents a trivalent metal selected from the group consisting of Ga, Al, In and B, and $0 \leq x \leq 0.1$, $0 \leq y \leq 0.1$ and $0 \leq z \leq 0.1$. The preparation method includes the steps of: adding a specified chemical agents -strontium oxide, titanium oxide, at least one divalent transition metal selected from the group consisting of Zn, Mn, Co, Ni, Cu and Cd, and oxide of at least one trivalent metal selected from the group consisting of Ga, Al, In and B, praseodymium (Pr) oxide or praseodymium salt, and mixing the resulting material homogeneously; and firing the mixture.

Preferably, the strontium oxide is $SrCO_3$ or SrO, the titanium oxide is $TiO_2$, the divalent transition metal is Zn, the trivalent metal is Ga and the praseodymium salt is $PrCl_3 \cdot xH_2O$.

In addition, it is preferable that the mixture is fired at a temperature of 900 to 1,300° C. for 10 hours or less. This makes it possible to optimize the surface composition, the particle size and the shape of the final product, phosphor powder, thus maximizing the optical characteristics of the $SrTiO_3$- based phosphor.

In accordance with the present invention as stated above, the structure of $SrTiO_3$ is modified by the addition of $Ga^{3+}$ and $Zn^{2+}$ as dopants to $SrTiO_3$ which was prepared from $SrCO_3$ or SrO, and $TiO_2$. Modification of structure leads to enhance excitation efficiency of an activator, $Pr^{3+}$, and its luminescence increased. And also it has a single emission band and thus high color purity. That is, the present invention involves addition of $Ga^{3+}$ and $Zn^{2+}$ instead of the composition ratio of $SrCO_3$ or SrO to $TiO_2$ at 1:1. The additives replace some part of Ti at the B site in the $ABO_3$ perovskite structure with $Ga^{3+}$ and $Zn^{2+}$ and thus modified the micro-structure of product. This modification leads to increase excitation efficiency of Pr3+, thereby enhancing luminescence and color purity of the phosphor.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

Hereinafter, a detailed description will be made with reference to the accompanying drawings as to a red phosphor for a fluorescent display and a preparation method thereof according to a preferred embodiment of the present invention.

To prepare a red phosphor having a formula of $SrTi_{1-x-y}M_xN_yO_3$: $zPr^{3+}(SrTiO_3:Pr^{3+}, Ga^{3+}, Zn^{3+})$ of the present invention, $SrCO_3$, $TiO_2$, $ZnO$, $Ga_2O_3$, and $PrCl_3$ $(H_2O)_7$ dissolved in water are added according to a defined composition of the formula in an alcohol-containing mortar, mixed homogeneously for 4 hours or more, and dried. The dried mixture is then put in an alumina crucible and fired for 10 hours or less in an electric furnace preheated at 900 to 1,300° C., to produce a red phosphor of $SrTi_{1-x-y}M_xN_yO_3:zPr^{3+}(SrTiO_3:Pr^{3+}, Ga^{3+}, Zn^{2+})$.

Figure 1:
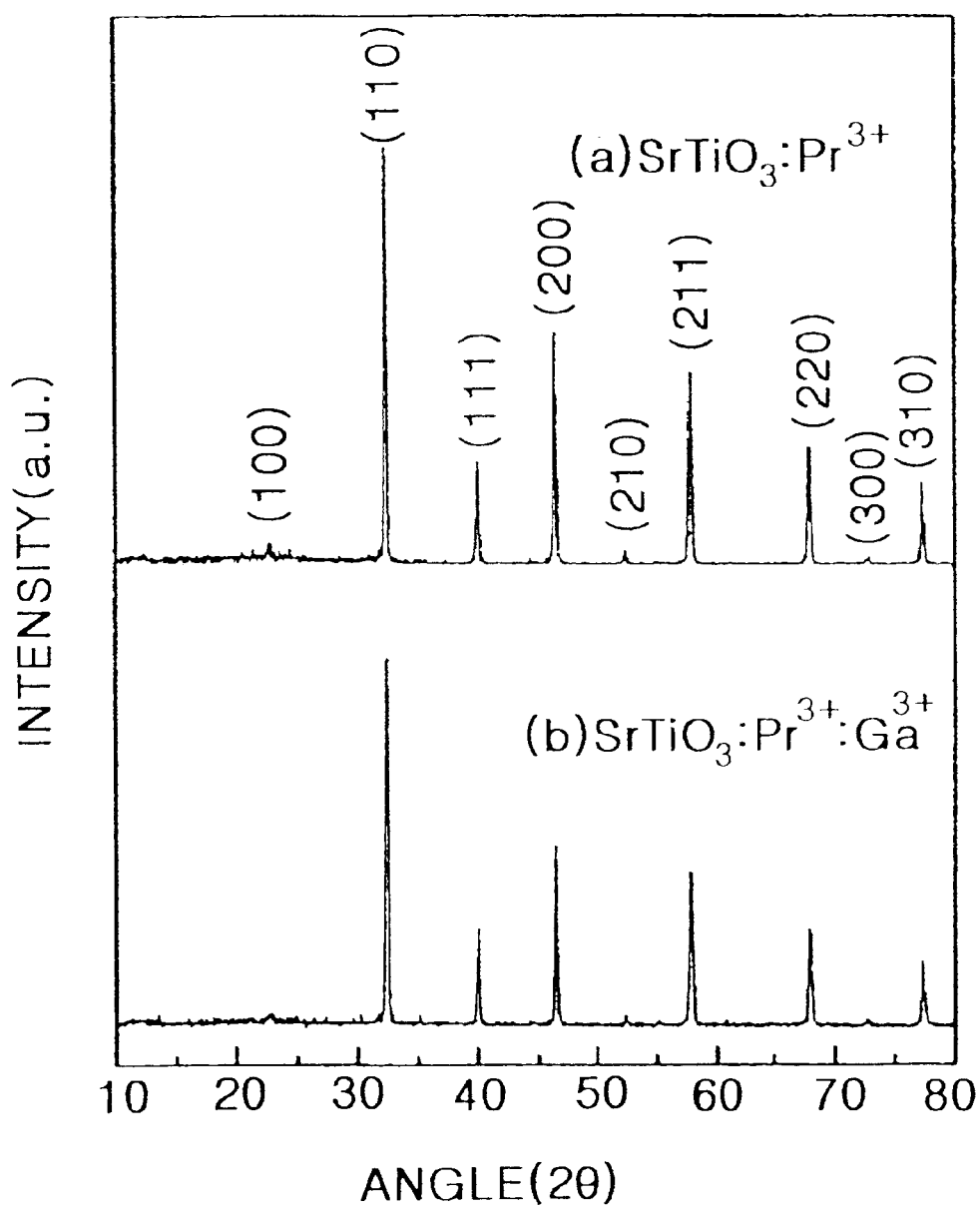
FIG. 1 shows X-ray diffraction (XRD) spectrums of an $SrTiO_3:Pr^{3+}$(1 mol %) phosphor and an $SrTiO_3:Pr^{3+}$(1 mol %) phosphor and an $SrTiO_3:Pr^{3+}$(1 mol %), $Ga^{3+}$(8 mol %) phosphor.
Figure 2:
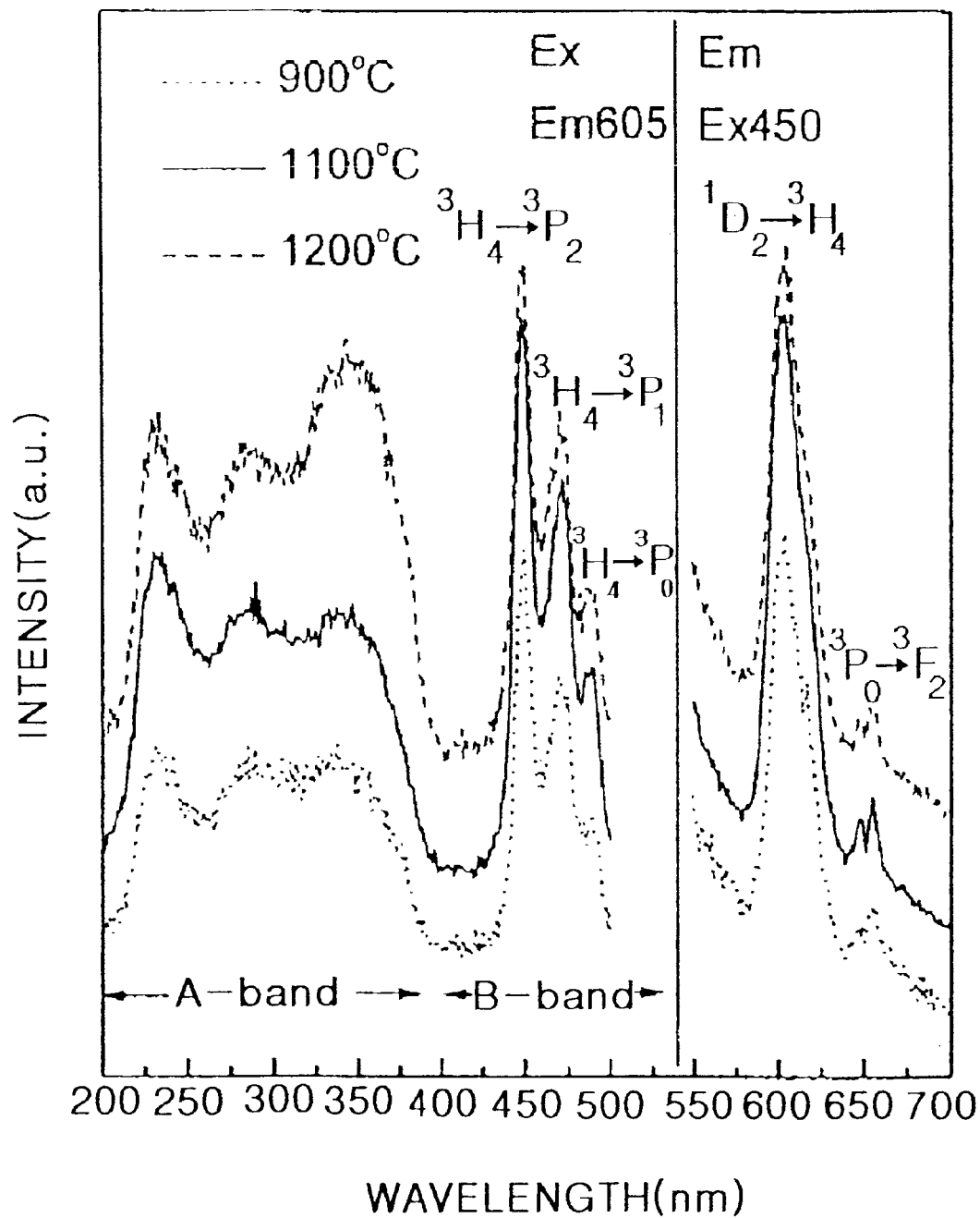
FIG. 2 shows a photoluminescence (PL) excitation and emission spectrum of an $SrTiO_3:Pr^{3+}$ phosphor depending on a firing temperature.

FIG. 1 shows X-ray diffraction (XRD) patterns of an $SrTiO_3$-based phosphor prepared by adding 1 mol % of $Pr^{3+}$ to $SrTiO_3$, and an $SrTiO_3$-based phosphor prepared by adding 1 mol % of $Pr^{3+}$ and 8 mol % of $Ga^{3+}$ to $SrTiO_3$. It reveals that addition of $Ga^{3+}$ up to 8 mol % to $SrTiO_3$ causes no structure change of the product, FIG. 2 is a photoluminescence (PL) excitation and emission spectrum of an $SrTiO_3:Pr^{3+}$ phosphor depending on a firing temperature. In the spectrum, the excitation band can be divided into an A-band of 200–388 nm and a B-band of 450–500 nm. The A-band results from excitation energy due to excitation of $SrTiO_3$ itself transferred to $Pr^{3+}$ ions, whereas the B-band results from direct excitation of $Pr^{3+}$ ions.

Figure 3:
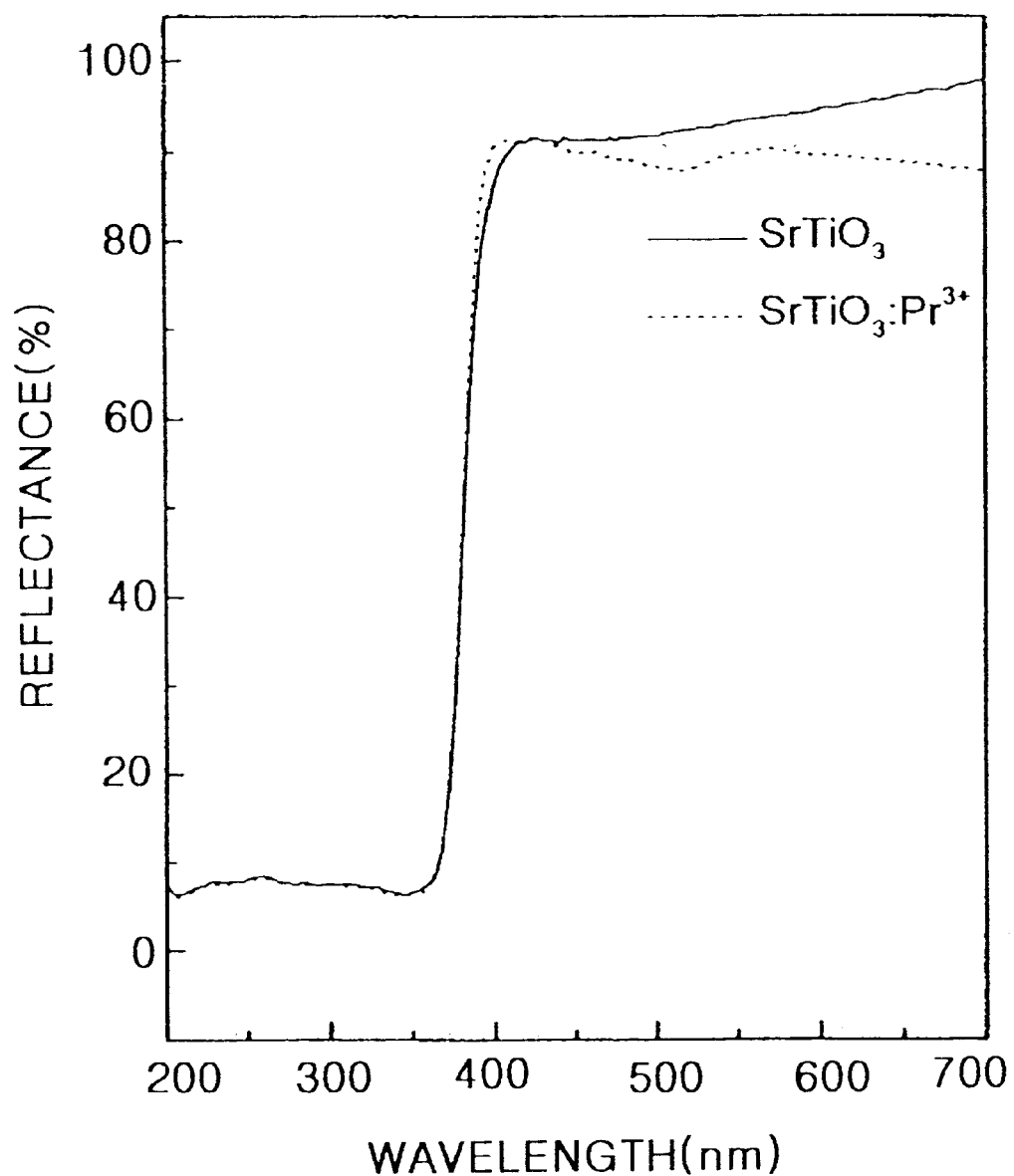
FIG. 3 shows reflection spectrums of a pure $SrTiO_3$ phosphor and an $SrTiO_3:Pr^{3+}$ phosphor of the present invention.

FIG. 3 shows reflection spectrums of a pure $SrTiO_3$ phosphor and an $SrTiO_3:Pr^{3+}$(1 mol %) phosphor of the present invention. The reflection spectrum of FIG. 3 is well in accord with the A-band of the excitation spectrum of FIG. 2. It is thus estimated that the excitation mechanism of the optically activated $Pr^{3+}$ ions in the $SrTiO_3$ crystals results from direct excitation of $Pr^{3+}$ ions by an incident beam energy (in the B-band) and indirect excitation of $Pr^{3+}$ ions by energy which was formed due to the recombination of the excited electron in conduction band and the hole in the valence band of $SrTiO_3$ (in the A-band).

Figure 4A:
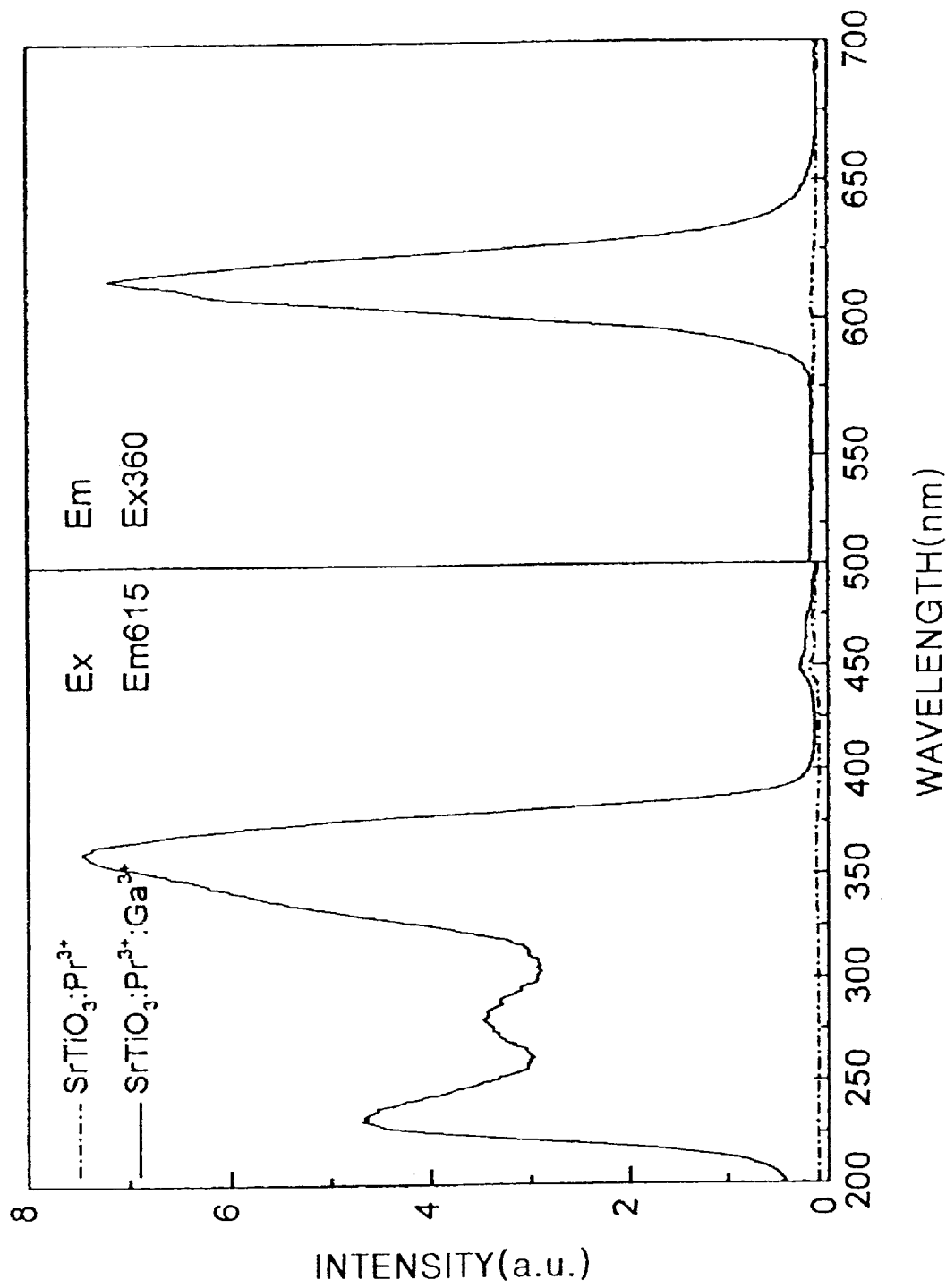
FIGS. 4A and 4B show PL excitation and emission spectrums of an $SrTiO_3:Pr^{3+}$ phosphor and an $SrTiO_3:Pr^{3+}$, $Ga^{3+}$ phosphor of the present invention.
Figure 4B:
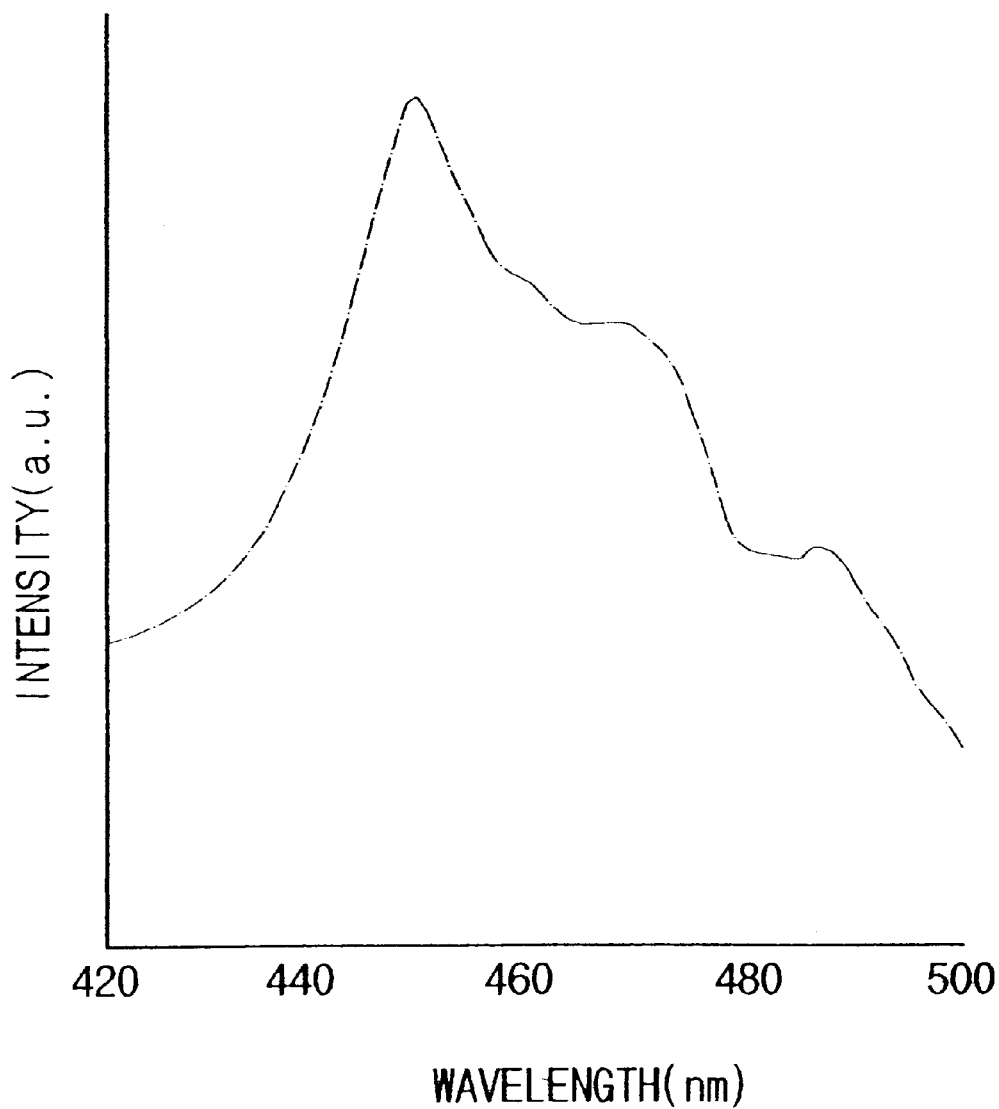

FIGS. 4A and 4B show PL excitation and emission spectrums of a $SrTiO_3:Pr^{3+}$ and an $SrTiO_3:Pr^{3+}$, $Ga^{3+}$ phosphor of the present invention. As shown in FIG. 1A, the PL emission band appears at 615 nm excited at 360 nm. FIG. 1B shows the magnified view of the portion depicted by a dashed circle in FIG. 1A.

Figure 5:
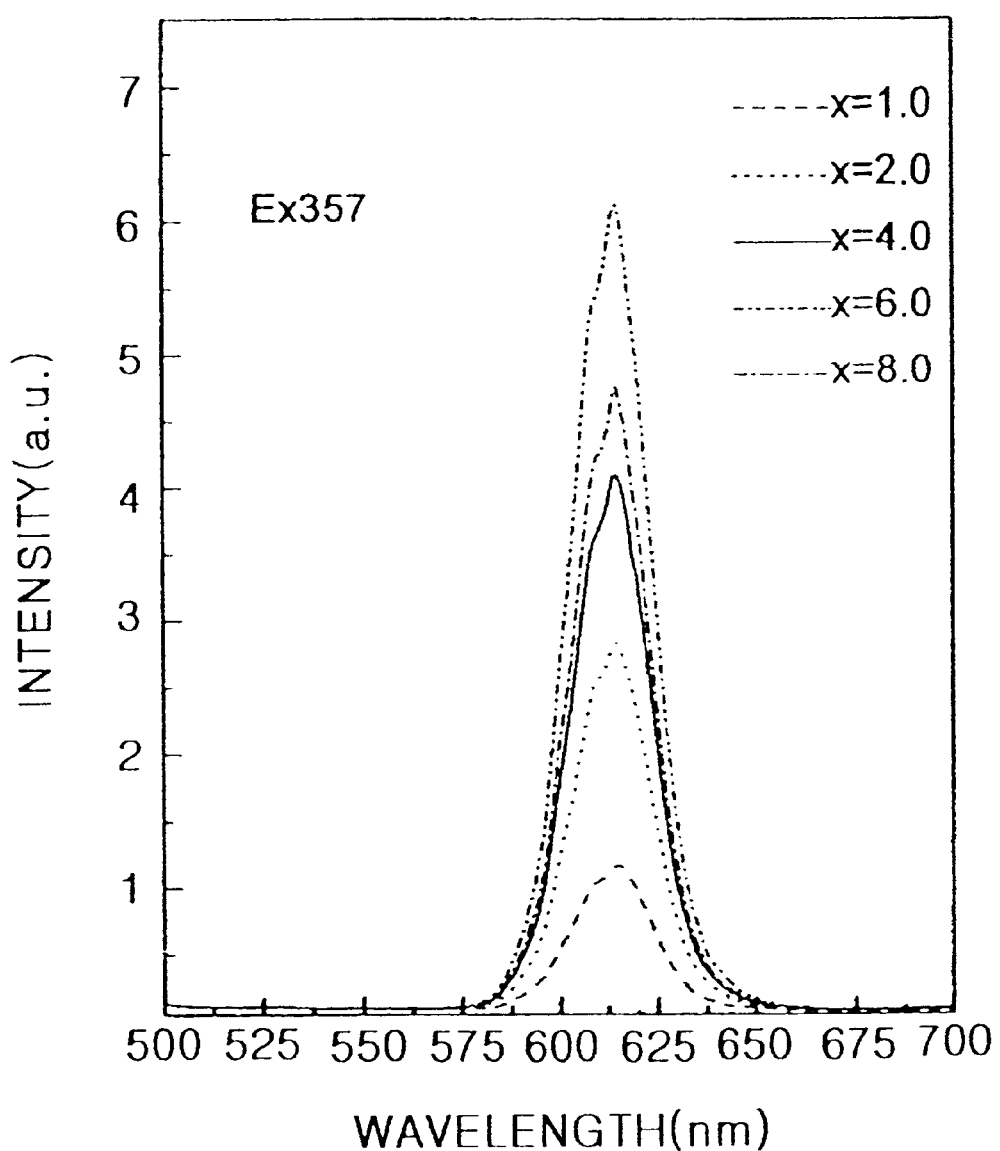
FIG. 5 shows emission spectrums of an $SrTiO_3:Pr^{3+}$(1.0 mol %) phosphor and an $SrTiO_3:Ga^{3+}$(x mol %) phosphor depending on the quantity of $Ga^{3+}$ added with respect to the phosphors fired at 1,200° C.

An addition of $Ga^{3+}$ to $SrTiO_3$ increases concentration of acceptors and hence possibility of recombination of excited electrons and holes, thus causing an increase in the luminescence intensity. FIG. 5 shows emission spectrums of an $SrTiO_3:Pr^{3+}$(1.0 mol %) phosphor and an $SrTiO_3:Ga^{3+}$(xmol %) phosphor depending on the quantity of $Ga^{3+}$ fired at 1,200° C. It is observed from FIG. 5 that the luminescence intensity increases with an increase in the quantity of $Ga^{3+}$ up to 6 mol % but decreases at 8 mol % of $Ga^{3+}$ added.

Figure 6:
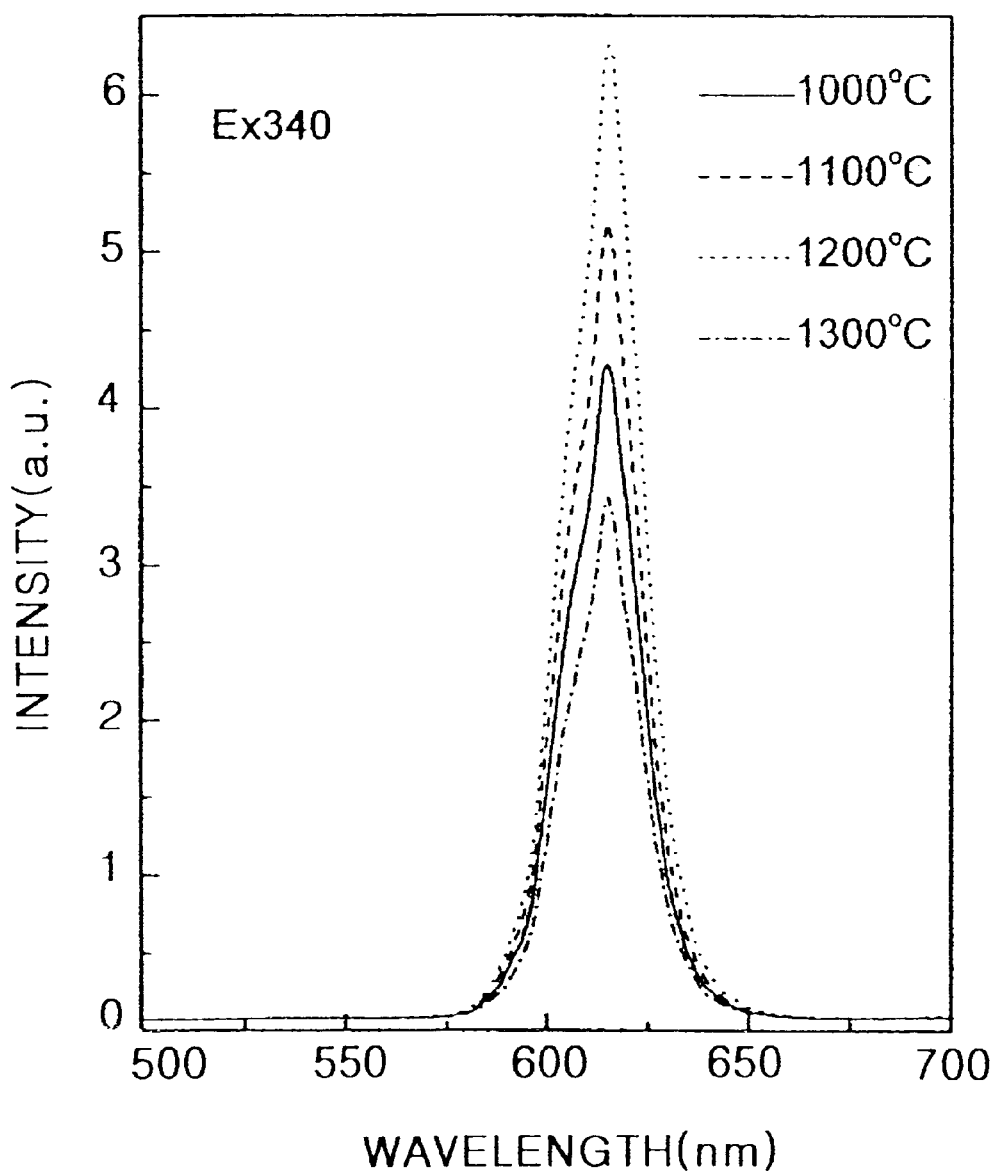
FIG. 6 shows a PL emission spectrum of a $SrTiO_3:Pr^{3+}$, $Ga^{3+}$ phosphor depending on the firing temperature.

FIG. 6 shows a PL emission spectrum of an $SrTiO_3:Pr^{3+}$, $Ga^{3+}$ phosphor depending on a firing temperature. As shown in FIG. 6, the luminescence intensity increases with an increase in the firing temperature up to 1,200° C. but decreases at 1,300° C.

That is, the quantity of $Pr^{3+}$ and $Ga^{3+}$ added has a great effect on the luminescence intensity, the best result is obtained at the quantity ratio of $Pr^{3+}$ to $Ga^{3+}$ being 1:4 to 1:6.

Figure 7:
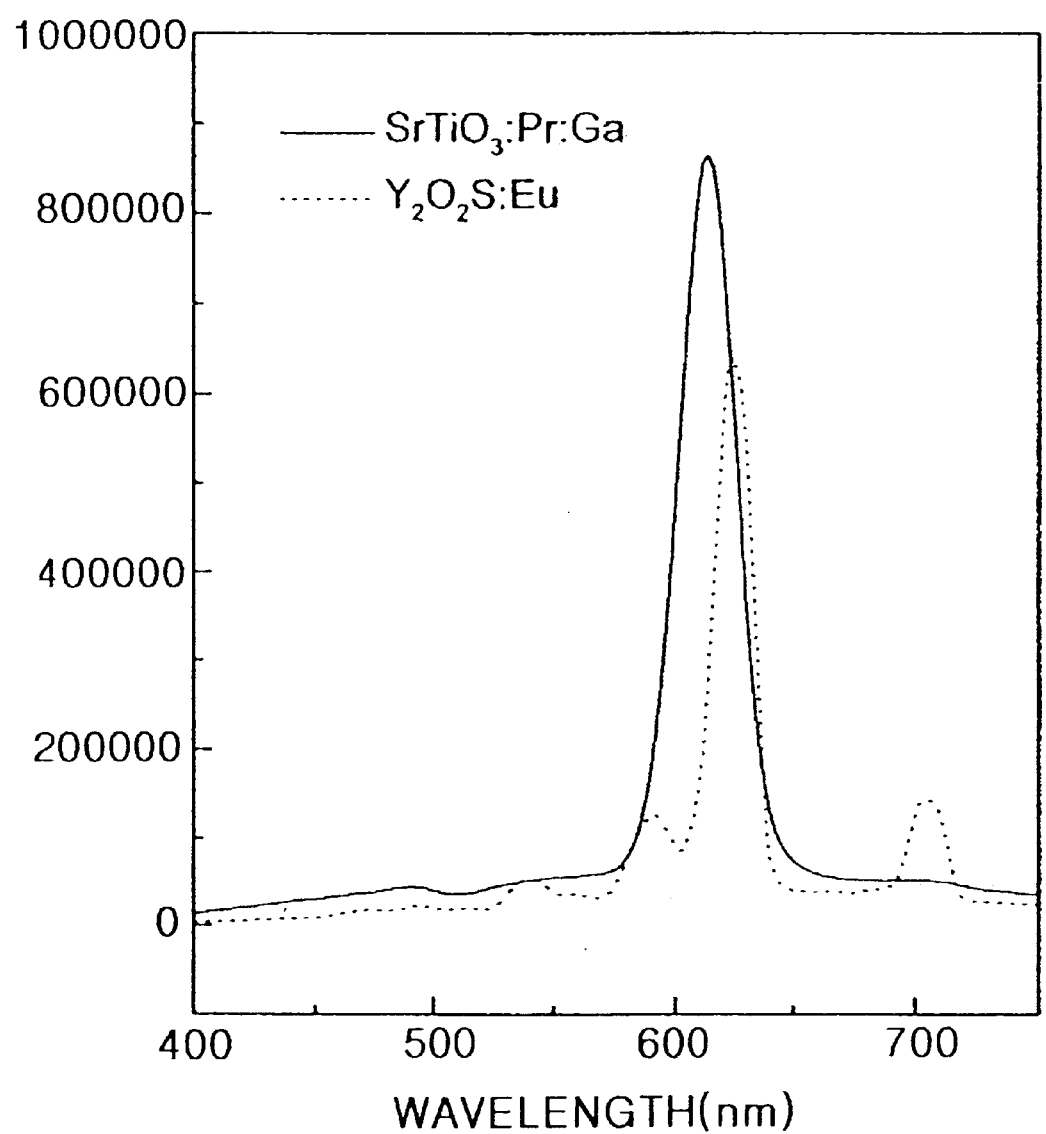
FIG. 7 shows cathodoluminescence (CL) emission spectrums of an optimal $SrTiO_3:Pr^{3+}$, $Ga^{3+}$ phosphor and a commercial CRT red phosphor, $Y_2O_2S:Eu^{3+}$ measured at an acceleration voltage of 800 V.

There is shown in FIG. 7 cathodoluminescence (CL) emission spectrums of an optimal $SrTiO_3:Pr^{3+}$, $Ga^{3+}$ phosphor and a commercial CRT red phosphor, i.e., $Y_2O_2S:Eu^{3+}$ measured at an acceleration voltage of 800 V. It is found that the luminescence intensity of the phosphor of the present invention is about double that of the CRT red phosphor.

Figure 8:
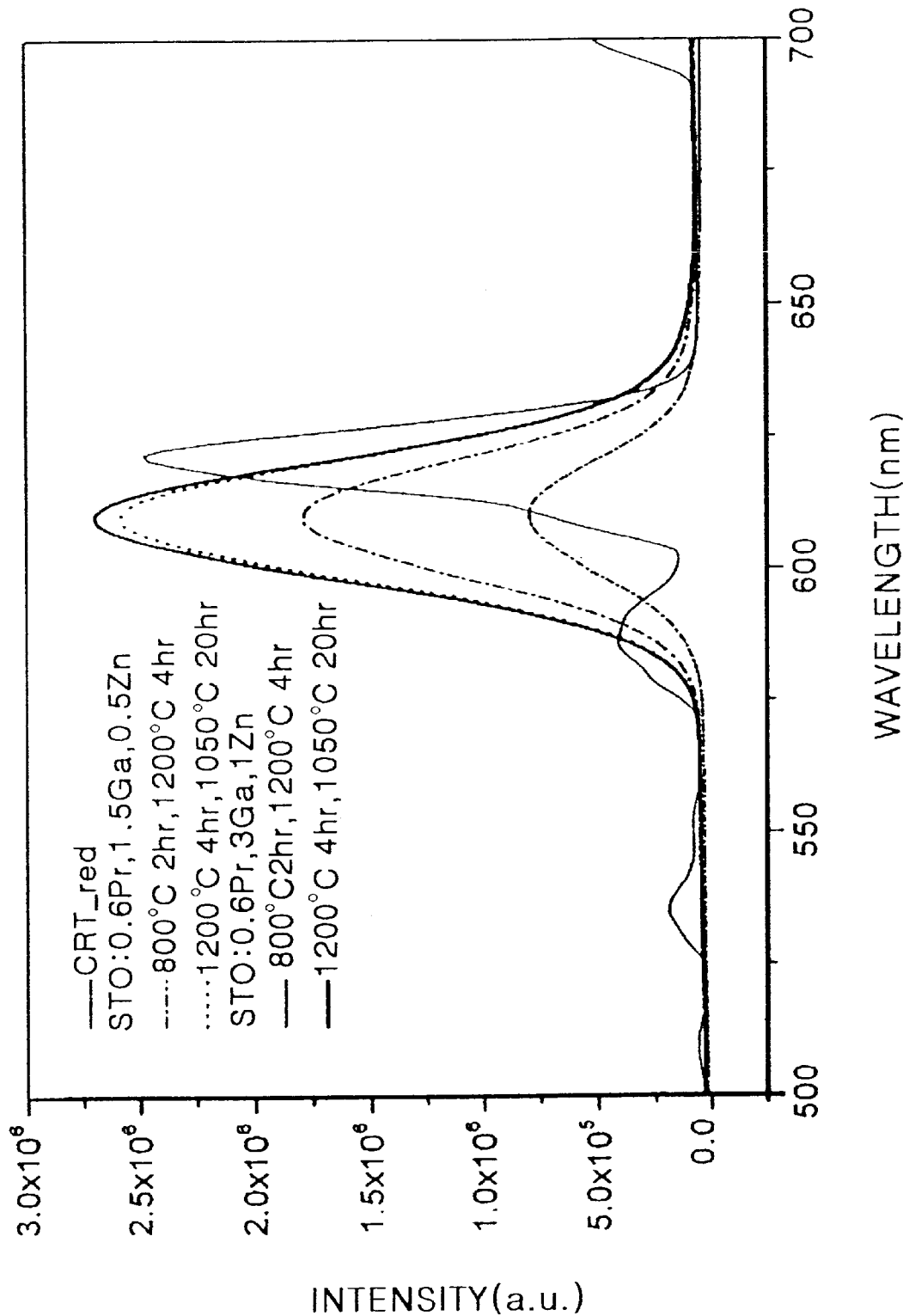
FIG. 8 shows a CL emission spectrum of an $SrTiO_3:Pr^{3+}$, $Ga^{3+}$, $Zn^{2+}$ phosphor.

An $SrTiO_3:Pr^{3+}$, $Ga^{3+}$, $Zn^{2+}$ phosphor is prepared by adding $Zn^{2+}$ to the $SrTiO_3:Pr^{3+}$, $Ga^{3+}$ phosphor for the purpose of enhancing luminescence efficiency of the phosphor at a low acceleration voltage. A CL emission spectrum of the $SrTiO_3:Pr^{3+}$, $Ga^{3+}$, $Zn^{2+}$ phosphor is shown in FIG. 8. The spectrum reveals that the phosphor of the present invention has a luminescence intensity exceeding double that of the commercial CRT red phosphor, $Y_2O_2S:Eu^{3+}$ and exhibits superior properties at a low acceleration voltage of less than 800 V.

Figure 9A:
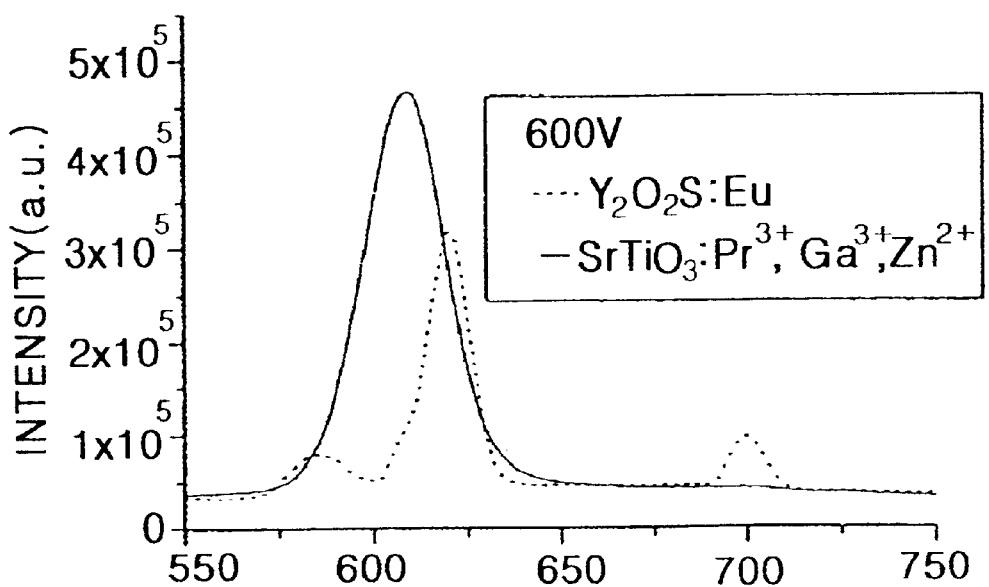
FIG. 9 shows a CL spectrum of the $SrTiO_3:Pr^{3+}$, $Ga^{3+}$, $Zn^{2+}$ phosphor depending on an acceleration voltage.
Figure 9B:
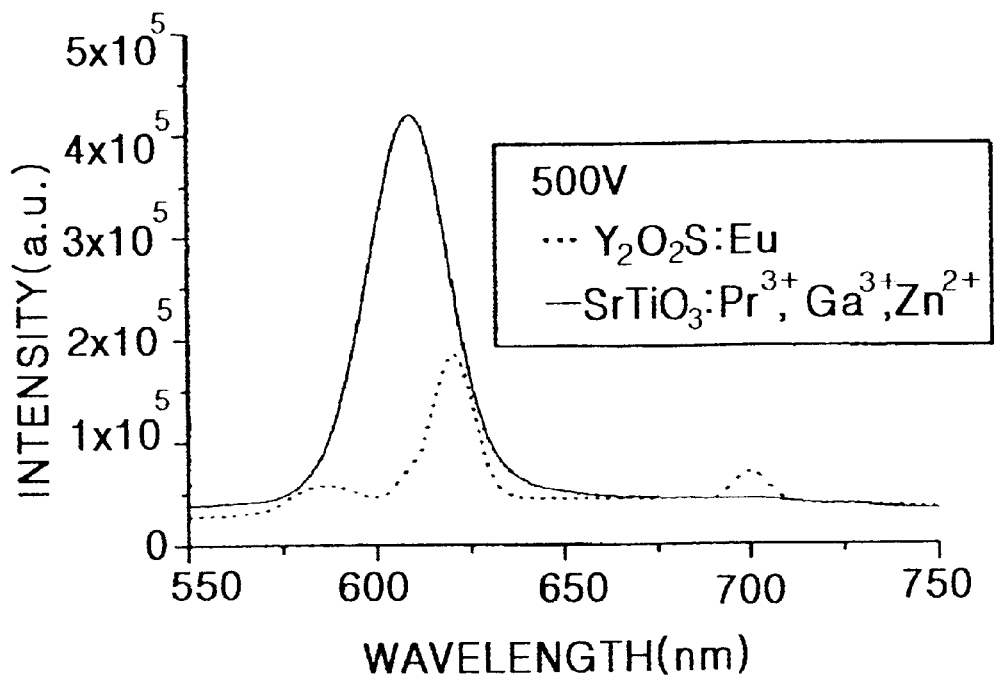

FIG. 9 shows a CL spectrum of the $SrTiO_3:Pr^{3+}$, $Ga^{3+}$, $Zn^{2+}$ phosphor depending on an acceleration voltage. As shown in FIG. 9, at an acceleration voltage of 500 V, the phosphor of the present invention has a luminescence intensity as high as about five times the commercial CRT red phosphor, $Y_2O_2S:Eu^{3+}$. A color purity experiment reveals that the phosphor of the present invention has a high color purity of x=0.660, y=0.336, whereas the commercial CRT red phosphor, $Y_2O_2S:Eu^{3+}$ has a color purity of x=0.642, y=0.345.

The phosphor of the present invention is an oxide-based phosphor which is stable under thermal shock, electron irradiation and other external stimuli. Thus, the $SrTiO_3$- based phosphor having a perovskite structure applied to a fluorescent display or an anode plate of FED panel can prevent dissociation of the phosphors due to a long-term irradiation of electrons without breaking the vacuum, thus maintaining performance of the panel for a long time.

The phosphor of the present invention is also applicable to a fluorescent display or a high performance FED panel due to its high luminescence and high color purity (emission band wavelength: 615 nm; color coordinates: x=0.660, y=0.336) at a low acceleration voltage.

Therefore, the phosphor of the present invention is expected to provide excellent performance such as high luminescence and high definition in the fluorescent display and greatly contribute to the commercial use of low-voltage FEDs.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A phosphor for a fluorescent display, comprising at least one divalent transition metal and at least two trivalent metal added to $SrTiO_3$ and having a formula of:

$$SrTi_{1-x-y}M_xN_yO_3:zPr^{3+}$$

wherein M represents the divalent transition metal selected from the group consisting of Zn, Mn, Co, Ni, Cu and Cd, wherein N represents the trivalent metal selected from the group consisting of Ga, Al, In and B, and wherein $0<x\leqq0.1$, $0<y\leqq0.1$ and $0\leqq z\leqq0.1$.

2. A preparation method of a phosphor for a fluorescent display having a formula of:

$$SrTi_{1-x-y}M_xN_yO_3:zPr^{3+}$$

wherein M represents a divalent transition metal selected from the group consisting of Zn, Mn, Co, Ni, Cu and Cd, wherein N represents a trivalent metal selected from the group consisting of Ga, Al, In and B, and wherein $0<x\leqq0.1$, $0<y\leqq0.1$, said preparation method comprising the steps of:
(a) adding strontium carbonate or strontium oxide, titanium oxide of at least one divalent transition metal selected from the group consisting of Zn, Mn, Co, Ni, Cu and Cd, oxide of at least one trivalent metal selected from the group consisting of Ga, Al, In, and B, praseodymium (Pr) oxide or praseodymium salt, and mixing the resulting material homogeneously in the solvent; and
(b) firing the mixture.

3. The preparation method as claimed in claim 2, wherein the strontium carbonate is $SrCO_3$ and the strontium oxide is SrO, the titanium oxide is $TiO_2$, the divalent transition metal is Zn, the trivalent metal is Ga and the praseodymium salt is $PrCl_3\cdot xH_2O$.

4. The preparation method as claimed in claim 2, wherein the mixture is fired at a temperature range from 900 to 1,300° C. for 10 hours or less.

5. A method of preparing a phosphor for a fluorescent display, comprising:

obtaining strontium carbonate; titanium oxide of at least one divalent transition metal selected from the group consisting of Zn, Mn, Co, Ni, Cu and Cd; oxide of at least one trivalent metal selected from the group consisting of Ga, Al, In, and B; and praseodymium (Pr) oxide or praseodymium salt in water;

mixing a resulting material in an alcohol solvent; and firing the mixture to produce a phosphor having a formula of:

$$SrTi_{1-x-y}M_xN_yO_3:zPr^{3+}$$

wherein M represents a divalent transition metal selected from a group consisting of Zn, Mn, Co, Ni, Cu and Cd; N represents a trivalent metal selected from a group consisting of Ga, Al, In and B; and $0<x\leqq0.1$, $0<y\leqq0.1$ and $0\leqq z\leqq0.1$.

6. The method as claimed in claim 5, wherein the mixture is fired in an electric furnace at a temperature range from 900 to 1,300° C. for 10 hours or less to produce the phosphor.

7. The method as claimed in claim 5, wherein the resulting material is mixed homogeneously for 4 hours or more.

8. The method as claimed in claim 5, wherein the strontium carbonate is $SrCO_3$ and the strontium oxide is SrO, the titanium oxide is $TiO_2$, the divalent transition metal is Zn, the trivalent metal is Ga and the praseodymium salt is $PrCl_3\cdot xH_2O$.

9. The method as claimed in claim 8, wherein the phosphor has a high color purity of x=0.66 and y=0.336.

10. The method as claimed in claim 9, wherein the mixture is dried and then put in an alumina crucible, and subsequently fired in an electric furnace at a temperature range from 900 to 1,300° C. for 10 hours or less to produce the phosphor.

* * * * *